United States Patent [19]
Vanderwerf

[11] Patent Number: 5,940,149
[45] Date of Patent: Aug. 17, 1999

[54] PLANAR POLARIZER FOR LCD PROJECTORS

[75] Inventor: Dennis F. Vanderwerf, Austin, Tex.

[73] Assignee: Minnesota Mining and Manufacturing Company, St. Paul, Minn.

[21] Appl. No.: 08/988,899

[22] Filed: Dec. 11, 1997

[51] Int. Cl.$^6$ .................................................. G02F 1/1335
[52] U.S. Cl. ..................... 349/5; 349/96; 359/496
[58] Field of Search ........................ 349/5, 96; 359/487, 359/488, 496, 497, 833, 834

[56] References Cited

U.S. PATENT DOCUMENTS

| | | | |
|---|---|---|---|
| 1,610,423 | 1/1926 | Cawley | 359/496 |
| 4,928,123 | 5/1990 | Takafuji | 353/20 |
| 5,124,841 | 6/1992 | Oishi | 359/487 |
| 5,237,399 | 8/1993 | Inada et al. | 358/60 |
| 5,410,421 | 4/1995 | Huignard et al. | 359/15 |
| 5,428,469 | 6/1995 | Willett | 359/41 |
| 5,452,128 | 9/1995 | Kimura | 359/487 |
| 5,485,310 | 1/1996 | Inada | 359/495 |
| 5,555,186 | 9/1996 | Shioya | 359/40 |
| 5,555,189 | 9/1996 | Shioya | 359/496 |
| 5,566,367 | 10/1996 | Mitsutake et al. | 359/497 |
| 5,650,873 | 7/1997 | Gal et al. | 359/496 |

FOREIGN PATENT DOCUMENTS

| | | | |
|---|---|---|---|
| 0 573 905 A1 | 12/1993 | European Pat. Off. | G02B 27/28 |
| 0 615 148 A2 | 9/1994 | European Pat. Off. | G02B 27/28 |
| 0 757 274 A1 | 2/1997 | European Pat. Off. | G02B 27/28 |
| 0 777 146 A1 | 6/1997 | European Pat. Off. | G03B 21/00 |
| 0 856 762 A1 | 8/1998 | European Pat. Off. | G02B 27/28 |
| 8-220531 | 8/1996 | Japan | G02F 1/1335 |
| 8-179311 | 12/1996 | Japan | G02F 1/1335 |
| 9-15534 | 1/1997 | Japan | G02B 27/28 |
| 9-145926 | 6/1997 | Japan | G02B 5/30 |
| 9-146061 | 6/1997 | Japan | G02F 1/13 |
| 95/17691 | 6/1995 | WIPO | G02B 5/30 |
| 95/17699 | 6/1995 | WIPO | G02F 1/1335 |
| 95/27919 | 10/1995 | WIPO | G02B 27/28 |
| 96/35140 | 11/1996 | WIPO | G03B 5/30 |
| WO 96/35140 | 11/1996 | WIPO | G03B 5/30 |

*Primary Examiner*—William L. Sikes
*Assistant Examiner*—James Dudek
*Attorney, Agent, or Firm*—Nestor F. Ho

[57] ABSTRACT

A liquid crystal display projector including a light source, a collimator lens, a planar polarization converter, a liquid crystal display panel, and projection lenses. The collimator lens is optically aligned to receive a beam of light from the light source and to produce a collimated light beam. The planar polarization converter is optically aligned in front of the collimator lens to receive the collimated beam of light. The polarization converter includes a prismatic film having a first prismatic surface, a reflective polarization film, and a quarter wave retarder film positioned between the prismatic film and the polarization film sheet. The prismatic surface has alternating transmissive prismatic facets and reflective prismatic facets positioned at supplementary base angles, the reflective prismatic facets positioned at a second base angle $\beta$ and the transmissive prismatic facets positioned at a first base angle generally equal to $180°-\beta$.

26 Claims, 11 Drawing Sheets

PLANAR POLARIZER FOR LCD PROJECTORS

BACKGROUND OF THE INVENTION

The present invention relates to a flat polarization converter and to liquid crystal display (LCD) projection system designs including the novel flat polarization converter. More specifically, the present invention relates to a compact planar polarization converter for use, for example, in full-color large-diagonal LCD projection systems. Large diagonal LCD devices are defined as those devices having diagonal dimensions greater than 150 millimeters. The polarization converter of the present invention includes planar components to efficiently produce linear polarized light over a large area from an unpolarized light source.

Some single-panel LCD devices, and in particular projections systems, require polarized light. An efficient planar polarization device would aid greatly in the design of compact and portable LCD devices.

Unpolarized light includes a linear component and an orthogonal component. A common method for producing polarized light for an LCD projection panel, comprises of the use of a polarizing beam splitter (PBS) cube. The linearly polarized component light is transmitted by the PBS cube and directed to the LCD panel, while the orthogonal component is reflected away in a perpendicular direction. Another common method for producing polarized light comprises the use of an absorbing dye or iodine based polarizer film positioned between the light source and the LCD panel. The absorbing film transmits a single component linear polarized light in one direction, while absorbing the orthogonal component. The absorbing polarizer film is often integrally incorporated into the commercial LCD panel. Alternatively, a separate polarizer plate may be positioned between the light source and LCD.

Both the PBS cube and the absorbing polarizer methods are inefficient, in that a maximum of only one-half of the available light from the source is converted to polarized light for transmission through the LCD panel. Attempts have been made to recycle the reflected polarization component from a PBS cube. However, solid glass PBS cubes are bulky and impractical for compact or planar applications.

Recently, reflective polarizing sheet films have been developed. Use of a reflective polarizing sheet film, instead of an absorbing sheet polarizer, allows for the possibility of reflecting back the s-polarization component of a light beam in the direction of the light source. Methods have been described that return the reflected polarized light to a spherical reflector behind the light source, and back to the LCD panel. However, these methods require extremely precise alignment of the optical components for efficient recycling of the light. Also, these methods again are not easily suitable for compact applications.

Other systems attempt to improve efficiency by recycling the reflected polarized light from various types of polarization producing films without returning the light to the light source. Some of these systems use polarization conversion devices that use holographic optical elements to separate the polarization components. All of these systems can take up considerable space and are not suitable for compact applications or for large-gate LCD panels.

Recently, systems have been described that convert and recycle polarized light within a plate-like element.

Figure 1:
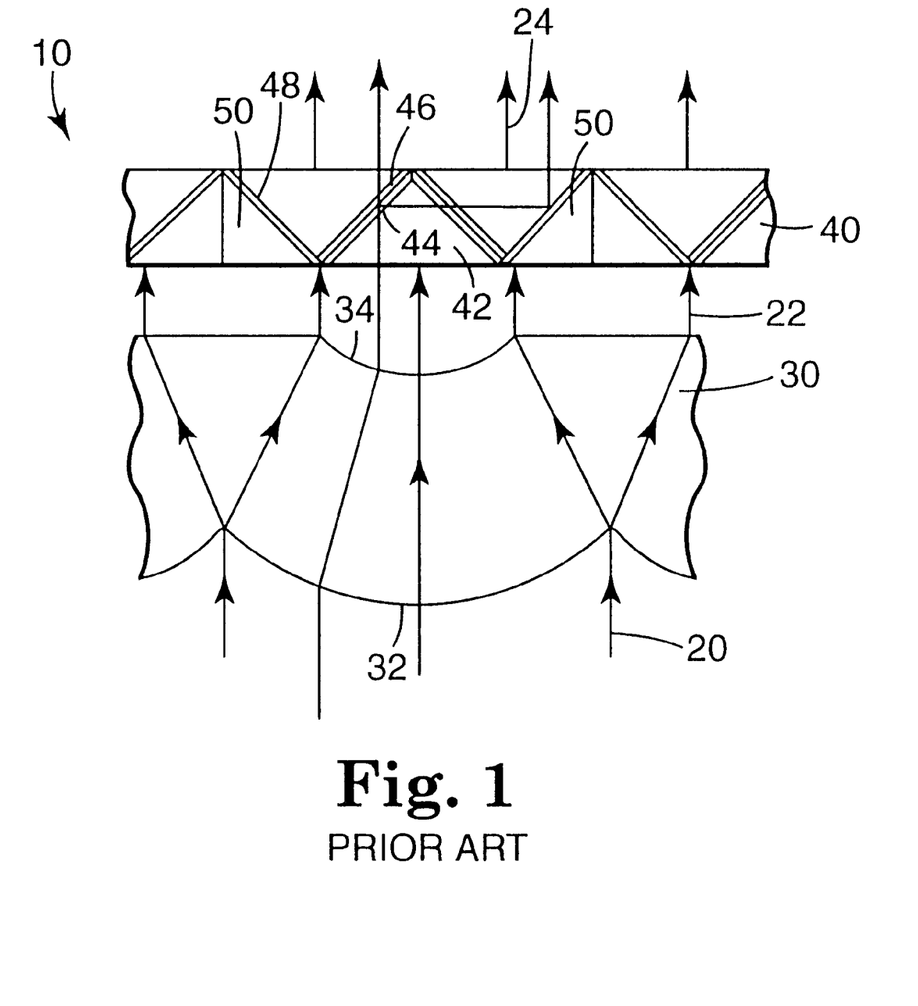
FIG. 1 is a cross-sectional elevation view of a prior art plate-like polarization converter.

FIG. 1 illustrates an earlier plate-like polarization converter 10 illustrated in U.S. Pat. No. 5,566,367. A beam of incident unpolarized and collimated light 20 is compressed into collimated sub-beams 22 by a lenticular element 30 including a converging microlens 32 and a diverging microlens 34. The sub-beams 22 are incident upon a second prismatic element 40. Linearly polarized beams 24 exit the prismatic element 40. The prismatic element 40 includes a first incidence side prism 42 having a series of quarter-wave retarder films 44 and reflective polarization beam splitting coatings 46. Total reflection mirrors 48 are formed on the contact surface of side prisms 50. In this polarization converter 10, precise registration between the converging microlens 32 and a diverging microlens 34 is required. More importantly, precise registration between the lenticular element 30 and the second prismatic element 40, and more precisely, between the diverging microlens 34 and the first incidence prism 42 is necessary for efficient operation. Likewise, precise thickness control of the elements is similarly required. These precise alignment and thickness requirements, combined with the deposition of the required coatings on selective prismatic surfaces, present significant manufacturing challenges.

SUMMARY OF THE INVENTION

The present invention includes a thin planar device that efficiently converts unpolarized light to linearly polarized light suitable for use in LCD projectors. The system makes use of linear microprismatic sheet elements, in conjunction with separate wide-angle reflective polarizer and retarder sheet films. No selective optical coatings are required on any of the microprismatic elements, and the functioning of the planar polarization converter is independent of element registration or thickness.

A planar polarization converter for polarizing a beam of light in accordance with the present invention includes a light deviation assembly, a dual sided prismatic film, a quarter wave retarder film, a planar reflective polarizer film, an optional absorbing polarization film and a beam integrating film optically aligned in sequence.

The light deviation assembly directs the beam of light in an angle $\beta$ towards the dual sided prismatic film. The prismatic film has a first prismatic surface and a second prismatic surface, the first prismatic surface having alternating transmissive prismatic facets or surfaces and reflective prismatic facets or surfaces positioned at supplementary base angles. The reflective prismatic facets are positioned at a second base angle $\beta_2$, while the transmissive prismatic facets are positioned at an internal first base angle $\beta_1$ and at a total base angle generally equal to $180°-\beta_2$, where $\beta_1=\beta_2=\beta$. A plurality of retroreflective linear microprisms having a vertex angle $\alpha$ wherein $\alpha_2+2\beta_2=180°$ are located on the surface of the reflective prismatic facets. Both the absorbing polarization film and the reflective polarization film are aligned along the same polarization axis. In a preferred embodiment, the retarder film, the reflective polarizer film, and the absorbing polarizer film are stacked and mounted on a thin glass substrate.

In alternative embodiments, the light deviation assembly comprises one or more deviation prismatic sheets or one or more deviation prismatic sheets and a collimator. In a preferred embodiment $\beta$ generally equals 45°.

A liquid crystal display projector in accordance with the present invention includes a light source producing a beam of light, a collimator lens optically aligned to receive the beam of light and produce a collimated light beam, and a planar polarization converter as described above optically aligned to receive the collimated light beam. A liquid crystal display panel is optically aligned with the polarization converter and a projection lens assembly is optically aligned with the liquid crystal panel.

DETAILED DESCRIPTION OF THE INVENTION

Figure 2:
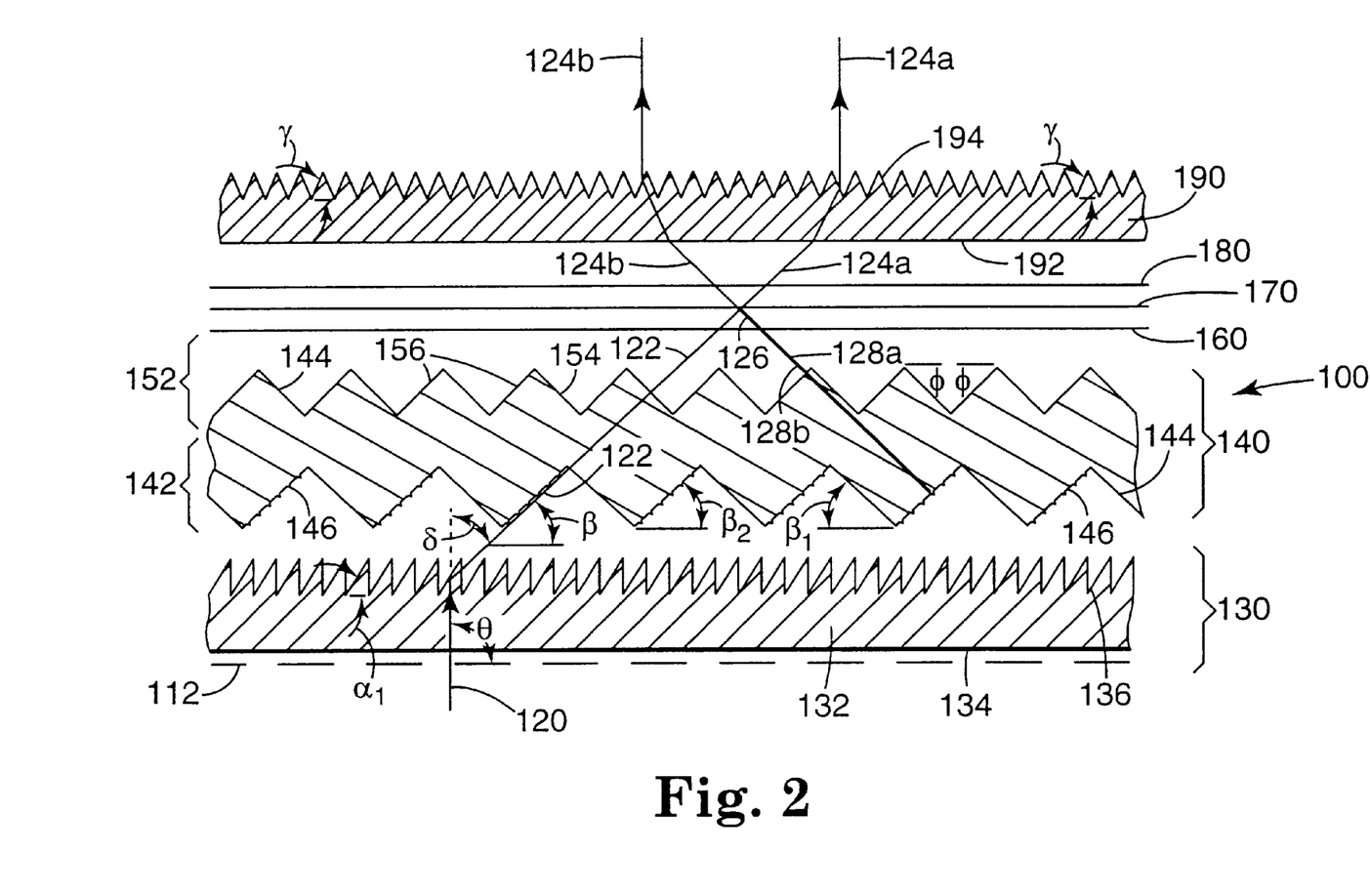
FIG. 2 is a cross-sectional elevation view of a planar polarization converter in accordance with the present invention.

FIG. 2 illustrates a cross-section of a planar polarization converter 100 in accordance with the present invention for polarizing a beam 120 of incident unpolarized and collimated light. The planar polarization converter 100 includes a light deviator assembly 130, a dual sided prismatic film or sheet 140, a quarter wave retarder film or sheet 160, a planar reflective polarizer film or sheet 170, an optional absorbing polarization film or sheet 180 and a beam integrating film or sheet 190, all optically aligned and stacked in sequence. The term "optically aligned" is defined as alignment along the optical path of a beam of light and includes instances where the optical path is folded, such as by a reflective surface, or deviated, such as by a prismatic surface. The order of incidence along the optical path of the beam of light defines front and back positions for the optical elements of the present invention.

The light alignment assembly 130 includes collimating elements and light deviating elements. In the present embodiment, the light collimating and deviating assembly 130 includes a first prismatic sheet 132 and a collimating lens 102 (shown in FIG. 7) that transforms a diverging beam 110 into the collimated beam 120. The first prismatic sheet 132 includes a planar surface 134 and a series of deviating prisms 136.

The light beam 120 is incident with the first prismatic sheet 132 at an incidence angle $\theta$. The deviating prisms 136 deviate the collimated light to a base angle $\beta$ (base angles are measured in a counterclockwise direction with respect to a reference base plane 112) by total internal reflection (TIR) and refraction. In the present embodiment, $\beta=45°$ and $\theta=90°$. The deviating prisms 136 have a base angle $\alpha_1$ (better seen in FIG. 3) and a deviation angle $\delta$ measured with respect to the angle of incidence, where $\theta=\beta+\delta$. Therefore, $\delta=45°$. For the deviating prisms 136 of the embodiment illustrated in FIG. 2, the base angle $\alpha_1=59.15°$ for acrylic plastic having a refractive index n=1.492 for yellow light. The width of the prismatic grooves is typically between 0.1 mm and 0.5 mm, with a typical sheet thickness between 1 mm and 3 mm.

The deviated light ray 122 then enters the dual-sided prismatic sheet 140. The dual-sided prismatic sheet 140 includes a lower prismatic surface 142 and an upper prismatic surface 152. The prismatic surfaces 142 and 152 have a plurality of prisms, each prism having first and second facets or surfaces oriented at supplementary first and second facet base angles, that is, the value of the first and second facet base angles add to 180°. The lower prismatic surface has alternating interleaved transmissive prismatic first facets 144 and reflective prismatic second facets 146. The reflective prismatic second facets 146 are positioned at a second facet base angle $\beta_2$. The transmissive prismatic first facets 144 are positioned at an internal facet base angle $\beta_1$ (measured clockwise with respect to the reference plane) and a first facet base angle generally equal to $180°-\beta_1$. The upper prismatic surface 152 includes alternating first and second transmissive prismatic facets 154 and 156 interleaved or interlaced at first and second facet base angles $180°-\beta_1$ and $\beta_2$ respectively.

In the planar polarization converter 100, $|\beta_1|=|\beta_2|=|\beta|=45°$, and is independent of the refractive index of the material. The value of $\beta=45°$ offers manufacturing efficiency by avoiding locking angles that would make it difficult to separate replicated parts. The first facets 146 and 156 are parallel to each other and are positioned perpendicularly with respect to parallel second facets 144 and 154. However, those skilled in the art will appreciate that a number of different values for the angles described may be chosen.

Since the transmissive prismatic facets 144 and 154 are parallel to each other and are perpendicular to the path of the deviated light ray 122, the light ray 122 passes undeviated through the dual-sided prismatic sheet 140. The light ray 122 then passes through the planar sheet of quarter-wave retarder 160, such as a wide-band type quarter-wave retarder, e.g., the Nitto Denko type NRF-QF03A from Nitto Denko Corporation, Tokyo, Japan, and impinges on the planar sheet of a wide-angle polarization separating film 170, such as 3M Dual Brightness Enhancement Film (DBEF) from 3M, St. Paul, Minn. The p-polarization component 124a of the light ray 122 is transmitted by the polarizer film 170, while the s-polarization orthogonal component 126 is reflected back, at an angle of $180°-\beta$, through the quarter-wave retarder sheet 160. The quarter-wave retarder converts the s-component 126 to a circularly polarized light ray 128a. The circularly polarized ray 128a then passes through the second prismatic facets 156 of the upper prismatic surface 152. Since the second transmissive prismatic facets 156 are perpendicular to the light ray 128a, the light ray 128a passes undisturbed through the upper prismatic surface 152 and impinges on the reflective facets 146 of the lower prismatic surface 142.

Figure 3:
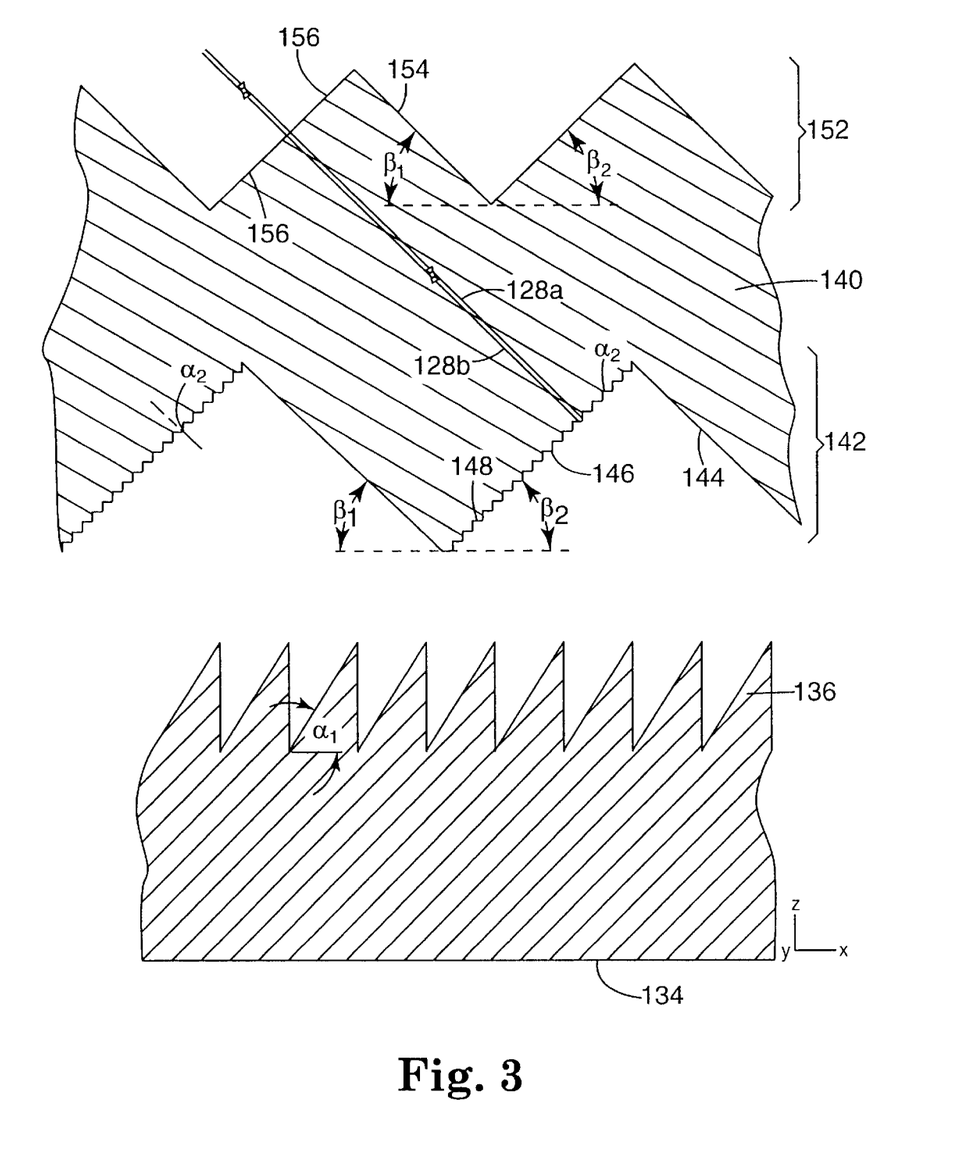
FIG. 3 is an enlarged detail cross-sectional elevation view of the planar polarization converter illustrated in FIG. 1.

FIG. 3 illustrates an enlarged detail of the planar polarization converter 100, including one of the reflective facets 146. The reflective facet 146 includes a series of microprisms 148 formed in the surface of the prism facet. The microprisms 148 have an apex angle $\alpha_2=90°$ and function as TIR retroreflectors, where $\alpha_2+2\beta=180°$. The light ray 128a is retroreflected as light ray 128b at the surface of the reflective facets 146. The reflected ray 128b is returned in the same angle and opposite direction as the incoming ray 128a. In the embodiment illustrated, the base prisms of the lower prismatic surface 142 have a width between 0.1 mm and 0.5 mm, while the retroreflecting microprisms 148 have a width between 0.01 and 0.05 mm.

As illustrated in FIG. 2, the reflected circularly polarized light ray 128b is then converted to a p-polarized light ray 124b upon passing through the quarterwave retarder film 160. The p-polarized light ray 124b is transmitted by the reflective polarizer film 170, after which the p-polarized light ray 124b impinge on the prismatic beam-integrating sheet 190. An iodine or dye clean-up absorbing polarizer film 180 may be positioned before the beam-integrating sheet 190 to absorb any stray components. Both the absorbing polarization film 180 and the reflective polarization film 170 are aligned along the same polarization axis. In the present exemplary embodiment, the absorbing polarizer is a high-contrast type iodine polarizer, such as the Nitto Denko type EG1425DUHCARP, from Nitto Denko Corporation, Tokyo, Japan.

The prismatic beam-integrating sheet 190 includes a lower planar surface 192 and a prismatic surface 194 having a prism base angle $\gamma$. By means of refraction at the planar surface 192 and the prismatic surface 194, both the original p-polarized rays 124a and the converted p-polarized light rays 124b are collimated. In an exemplary embodiment, the prism base angle $\gamma=66.1°$ for acrylic plastic having a refractive index n=1.492 for yellow light. The width of the prismatic grooves in prismatic surface 194 is typically between 0.1 mm and 0.5 mm, with a typical prismatic beam-integrating sheet 190 thickness between 1 mm and 3 mm.

The retarder film 160, the reflective polarizer film 170, and the absorbing polarizing film 180 are optically aligned, stacked and mounted on a thin glass substrate about 1 mm thick. When all components are closely stacked, the resulting total thickness of the polarization converter 100 is between 8 mm and 10 mm. When an extended collimated unpolarized light beam is incident on this planar polarization converter 110, a collimated and polarized light beam is produced.

Figure 4:
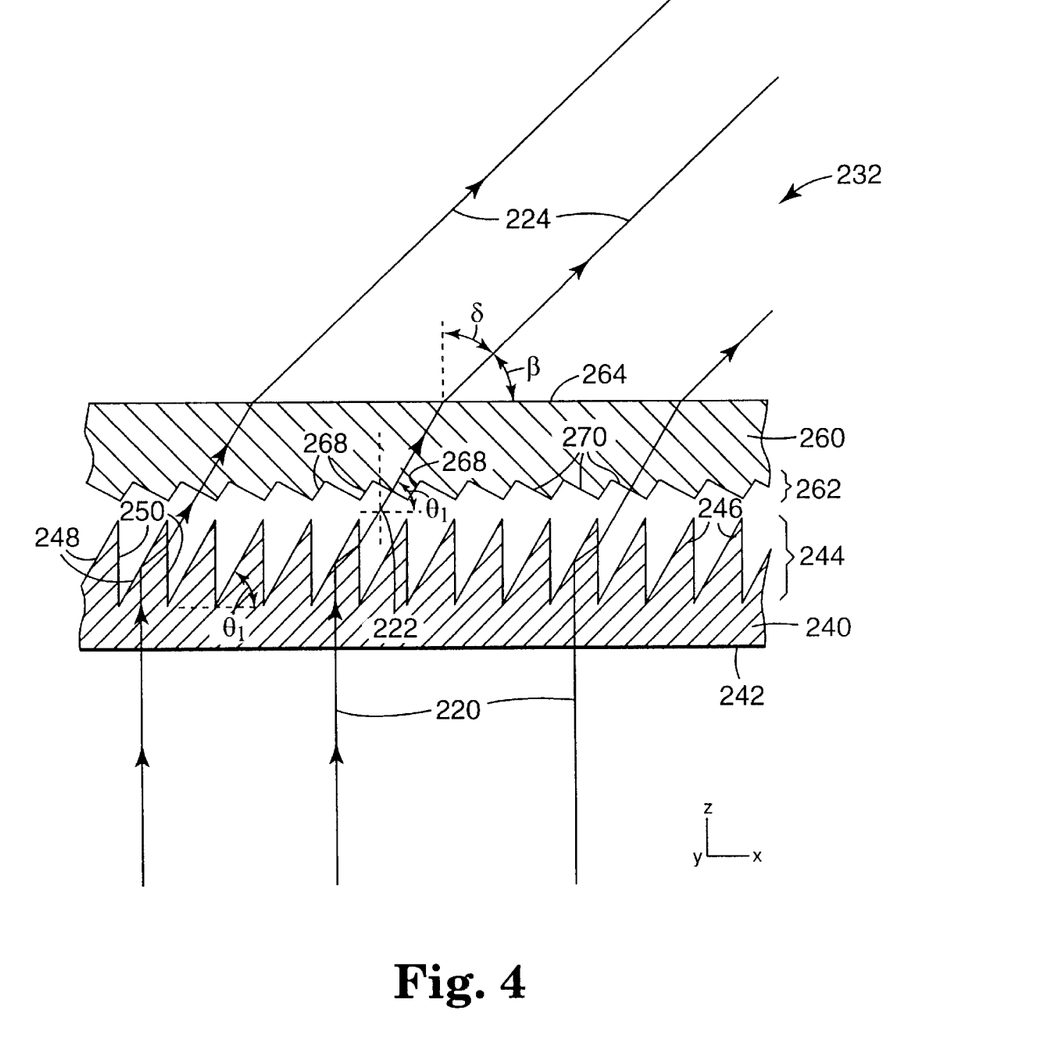
FIG. 4 is a cross-sectional elevation view of an alternative embodiment of a light deviation assembly in accordance with the present invention.

FIG. 4 illustrates an alternative embodiment of a light deviating element 232 of a light deviator assembly in accordance with the present invention. The light deviating element 232 includes a first prismatic element 240 and a second prismatic element 260. The first prismatic element 240 includes a lower planar surface 242 and an upper prismatic surface 244 having a series of prisms 246. Each prism 246 has a first facet 248 and a second facet 250. In the present exemplary embodiment, the lower planar surface 242 is perpendicular and the second facet 250 is parallel to incoming collimated unpolarized light rays 220. The first facet 248 has a base angle $\phi_1$ greater to or equal to the angle of TIR with respect to the light ray 220. The incoming light rays 220 pass undeviated through the lower planar surface 242, are deviated by TIR at the first facets 248 of the prisms 246 of the upper prismatic surface 244, and are subsequently refracted as internal light rays 222 to a base angle=$\phi_1$ at the second facet 250.

The second prismatic element 260 includes a lower prismatic surface 262 and an upper planar surface 264. The lower prismatic surface includes a plurality of prisms 266, each prism having a first facet 268 and a second facet 270. The second facets 270 are oriented at right angles with respect to the internal light rays 222. The first facet 268 is oriented at a base angle of $\phi_1$. Light rays are undeviated at facet 270 and refracted at planar surface 264, giving a deviation angle $\delta$ for exiting rays 224, where $\delta+\beta=90°$. In the present example, $\beta=45°$ and the deviation angle $\delta=45°$. Although the prismatic elements of the described polarization converter are designed for a deviation angle $\delta=45°$, it can be appreciated by those skilled in the art that polarization conversion systems using the teachings of the current invention can be designed using variations from this deviation angle.

Since the incoming ray 220 is parallel to the prismatic facet surface 250, and internal ray 222 is parallel to the prismatic facet surfaces 248 and 268, there are no geometric blockage losses of light rays and there is minimum geometric throughput loss.

Figure 5:
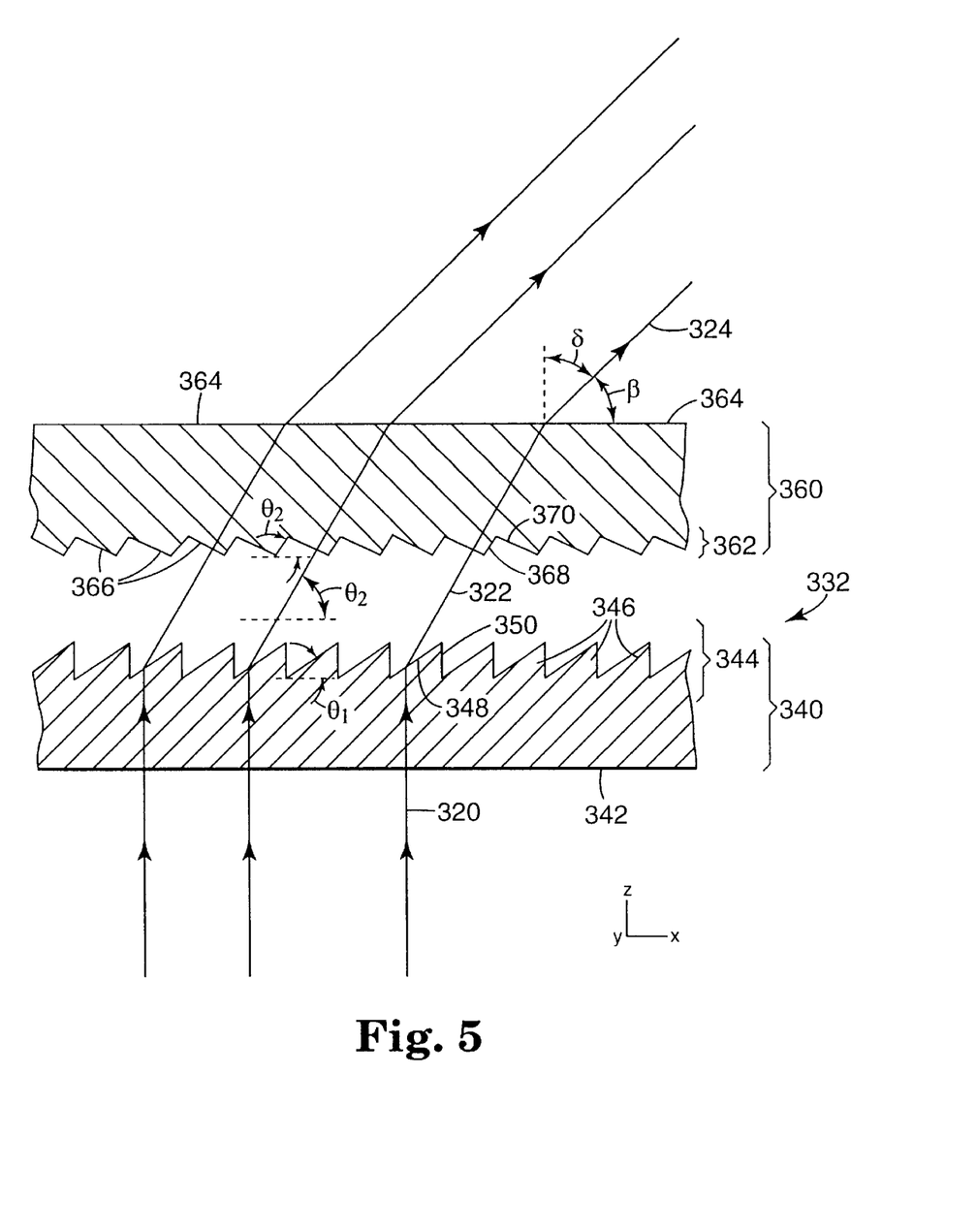
FIG. 5 is a cross-sectional elevation view of a second alternative embodiment of a light deviation assembly in accordance with the present invention.

FIG. 5 illustrates a second alternative light deviating element 332 of a light deviator assembly in accordance with the present invention. In the present embodiment, $\beta$, the desired deviation for exiting light rays 320, is equal to 45°. The light deviating element 332 includes a first prismatic element 340 and a second prismatic element 360. The first prismatic element 340 includes a lower planar surface 342 and an upper prismatic surface 344 having a series of prisms 346. Each prism 346 has a first facet 348 and a second facet 350. In the light deviating element 332, the lower planar surface 342 is perpendicular and the second facet 350 is parallel to the incoming collimated unpolarized light rays 320. The base angle $\phi_1$ of the first facet 348 is smaller than the angle of TIR with respect to the light ray 320. The incoming light rays 320 pass undeviated through the lower planar surface 342 and are refracted at the first facet 348 as internal light rays 322 at an internal angle $\phi_2$. In the present example, $\phi_2 \neq \phi_1$.

The second prismatic element 360 includes a lower prismatic surface 362 and an upper planar surface 364. The lower prismatic surface 362 includes a plurality of prisms 366, each prism 366 having a first facet 368 and a second facet 370. The second facet 370 is oriented at right angles with respect to the internal light rays 322. The first facet 368 is oriented at a base angle of $\phi_2$ and is parallel to the internal light rays 322. The internal light rays 322 are undeviated at the second facet 370, but are refracted at planar surface 364, giving a deviation angle $\delta$ for exiting rays 324. $\delta+\beta=90°$. In the present example, $\beta=45°$ and the deviation angle $\delta=45°$. The relationship between $\delta_2$ and $\delta$ is described by Snell's Law:

$$\sin(\delta) = n \sin(\pi/2 - \phi_2)$$

or $$\delta = a\sin(n \cos(\phi_2))$$

where n=refractive index of element 360

The incoming collimated light rays 320 are not refracted at planar surface 342, but are refracted by the first facet 348 and the planar surface 364. The exiting light rays 324 exit at deviation angle $\delta=45°$. Since the second facet 350 is parallel to the incoming light ray 320, and the prismatic surface 368 is parallel to internal light ray 322, there is minimal geometric blockage of light passing through the elements.

Figure 6:
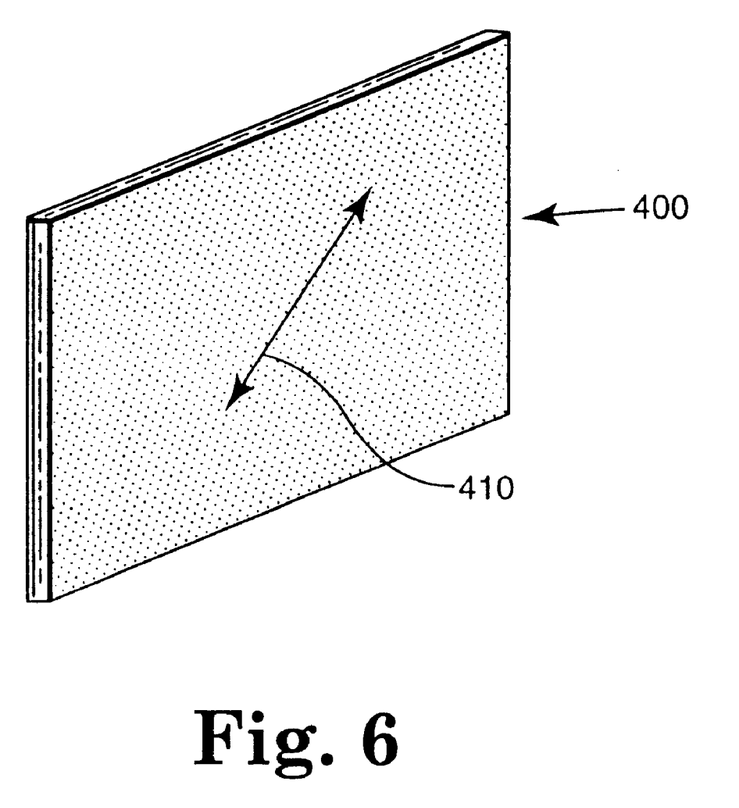
FIG. 6 is a perspective view of a planar polarization converter in accordance with the present invention having a tilted polarization transmission axis.

The present invention contemplates instances in which the polarization transmission axis of a receiving liquid crystal display (LCD) panel is tilted, that is, the transmission axis of the polarization film is not horizontal or vertical. FIG. 6 illustrates a planar polarization converter assembly 400 including a prismatic sheet in accordance with the present invention with a tilted orientation of the polarization transmission axis 410. The prismatic sheet has grooves 420 that are positioned orthogonal to the polarization axis 410. The prismatic grooves 420 may alternatively be oriented parallel to the polarization axis 410. Alternative embodiments may include grooves having vertical or horizontal orientations or orientations at angles other than 45°.

Figure 7:
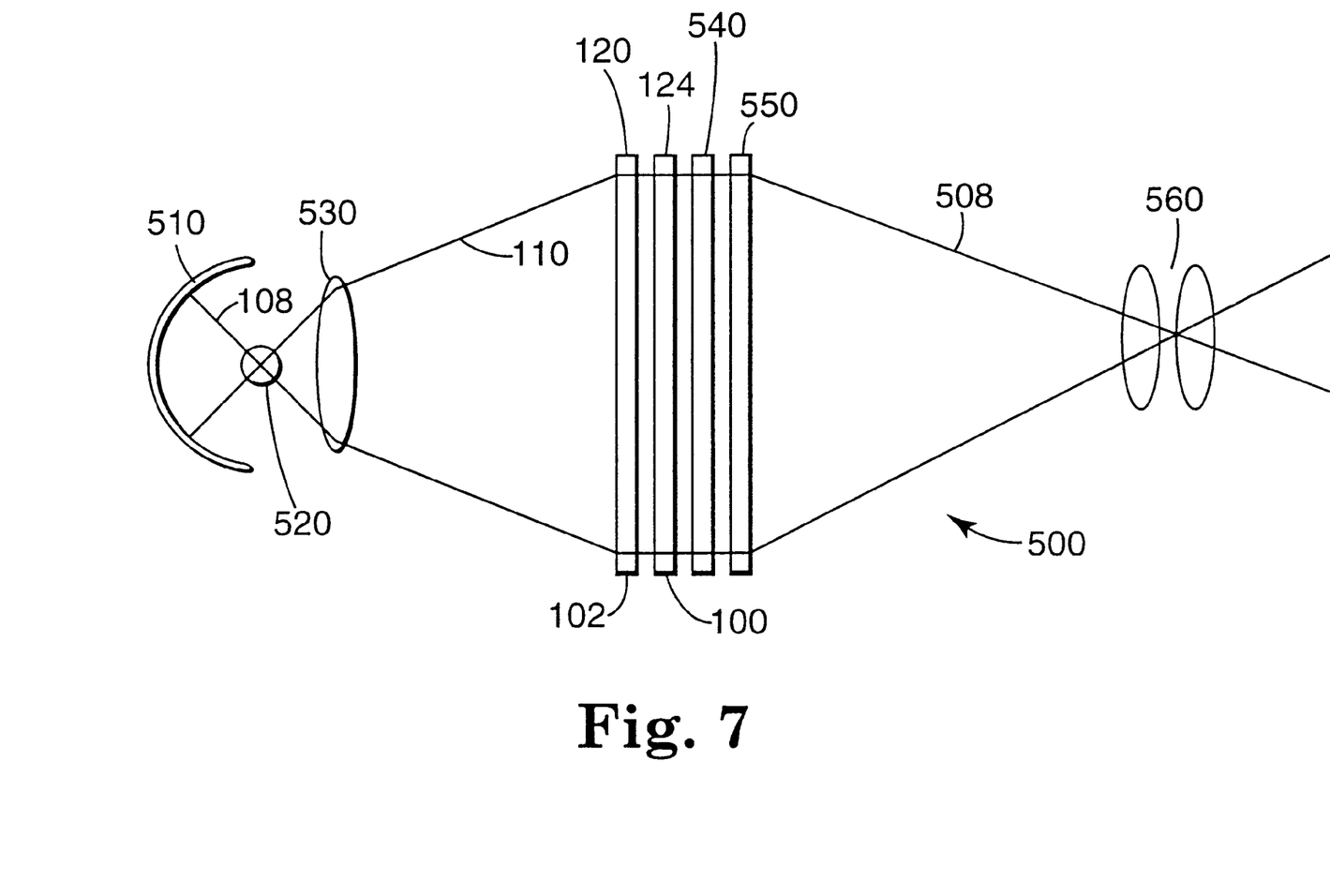
FIG. 7 is a simplified schematic side elevation view of a LCD projection system in accordance with the present invention.

FIG. 7 illustrates a straight-line configuration of a single-panel LCD projector assembly 500 including the planar polarization converter 100 illustrated in FIGS. 2 and 3. The LCD assembly 500 includes a back spherical reflector 510, a light source 520, a condenser lens 530, the planar polarization converter 100 including a collimating Fresnel lens 102, a single panel LCD 540, a field Fresnel lens 550, and projection lenses 560 all optically aligned along a generally straight path.

The light source 520 generally is positioned near the radius of curvature of the back spherical reflector 510 and behind the glass condenser lens 530. The term light source is intended to include any source of radiation used in conjunction with a projection system, including incandescent, tungsten quartz-halogen, metal halide, and other arc discharge lamps, as well as other sources of light known in the art. In the LCD assembly 500, the light source 520 is a 400 watt discharge lamp of the metal-halide type, such as the Osram type HMP 400 DE, from Osram, GmbH Munich, Germany, placed about 90 mm from the Fresnel collimating lens 102.

The light source 520 produces unpolarized light 108 which is directed forward by the spherical reflector 520 and refracted by the condenser lens 530. In the present exemplary embodiment, the rear glass spherical reflector 510 has a radius of curvature of 32 mm with a dichroic reflective coating and the condenser lens 530 is a glass aspheric condensing lens that receives the light rays 108 from the lamp 520 and directs the resulting light beam 110 to a 90 mm focal length Fresnel collimating lens 102.

The diverging light beam 110 is collimated by the Fresnel lens 102 into the collimated light beam 120. The planar polarization converter 100 converts the unpolarized collimated light beam 120 into linearly polarized collimated light rays 124 which impinge on the single-panel LCD 540. The light beams 124 pass through the LCD panel to form an image beam 508. The Fresnel field lens 550 converges the image beam 508 to the projection lens 560. The projection lens 560 projects an image of the LCD panel 540 to a screen for display.

In the present exemplary embodiment, the assembled planar polarization converter 100 is about 140 mm wide by 110 mm high by 10 mm thick, and is placed in front of a 160 mm diagonal SVGA TFT-LCD panel 540, such as the Sharp model No. LQ64SP1, from Sharp, Inc., Nara, Japan. The linear grooves of the polarization converter are oriented orthogonal to the polarization transmission axis of the LCD panel 540. The converging Fresnel lens 550 has a 152 mm focal length and converges the light to the projection lens 550, a 167 mm focal length, f/5.6 three-element projection lens which projects an image of the LCD panel.

Figure 8:
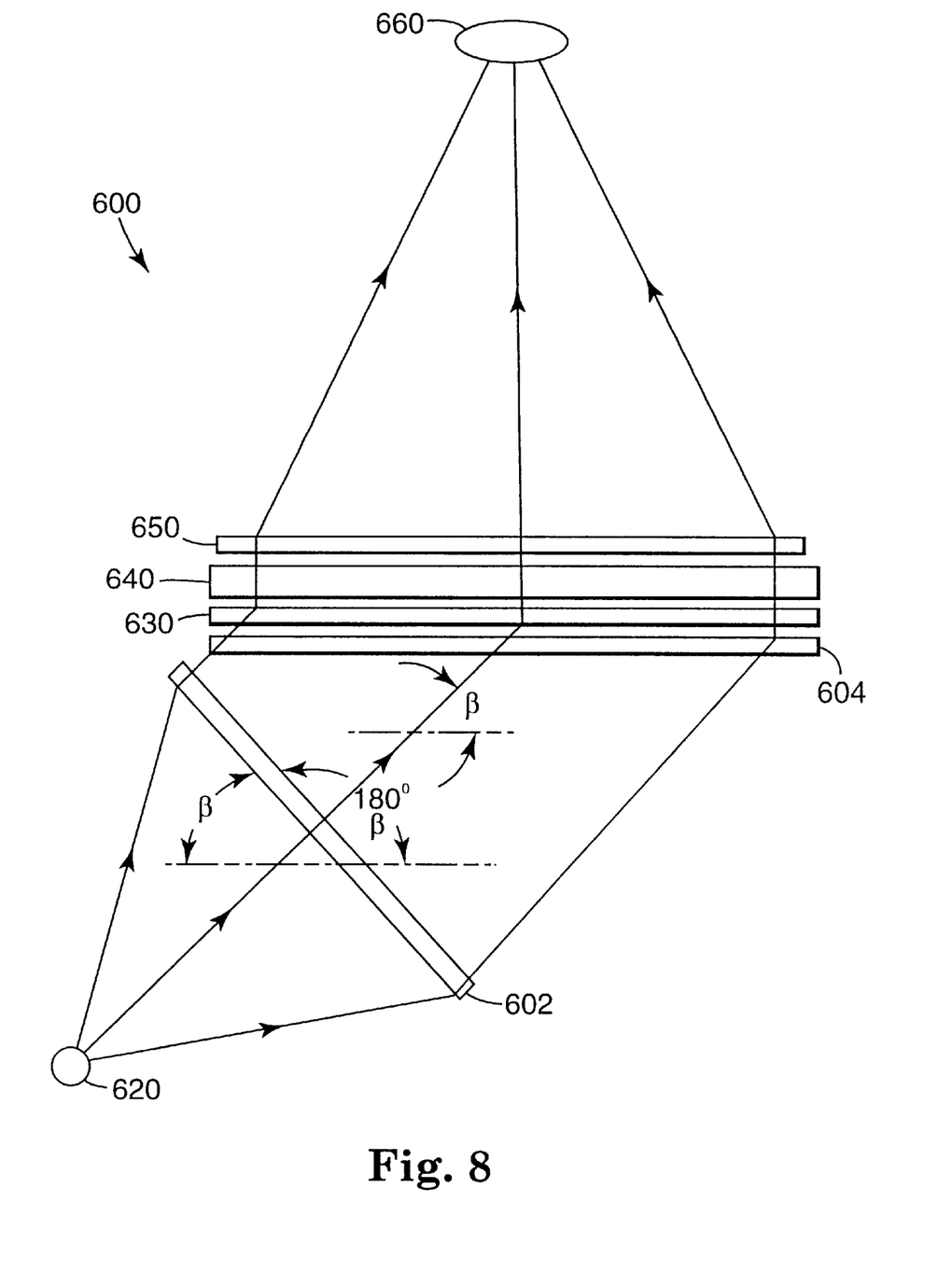
FIG. 8 is a simplified schematic plan view of a second LCD projection system in accordance with the present invention.

FIG. 8 illustrates an alternate second LCD projector assembly 600 having a light source 620, a planar polarization converter 604, a collimating Fresnel lens 602, a single panel LCD 640, and a converging Fresnel lens 650, the elements optically aligned. The LCD projector assembly 600 also may include projection lenses 660, and a back spherical reflector, and a condenser similar to those illustrated in FIG. 7. In the projector arrangement of the LCD projector assembly 600, the light source 620 and the Fresnel lens collimator 602 are positioned at a base angle 180°-β off-axis. In the present example, β=45° and the base angle is equal to 135°. The off-axis arrangement of the collimator 602 eliminates the need for light deviating elements in the light alignment assembly of the polarization converter 604. In alternative embodiments, the collimator may be placed at an off-axis base angle of $\lambda_1$ and the light alignment assembly may include a light deviator having a deviation angle of $\lambda_2$, where $\lambda_1+\lambda_2=\beta$. By the addition of a rotating half-wave retarder sheet 630, inserted between the polarization converter 604 and the LCD panel 640, the polarization axis of the polarization converter can be rotated to be in alignment with the polarization axis of the LCD panel, when the LCD panel polarization axis is not horizontal or vertical.

Figure 9:
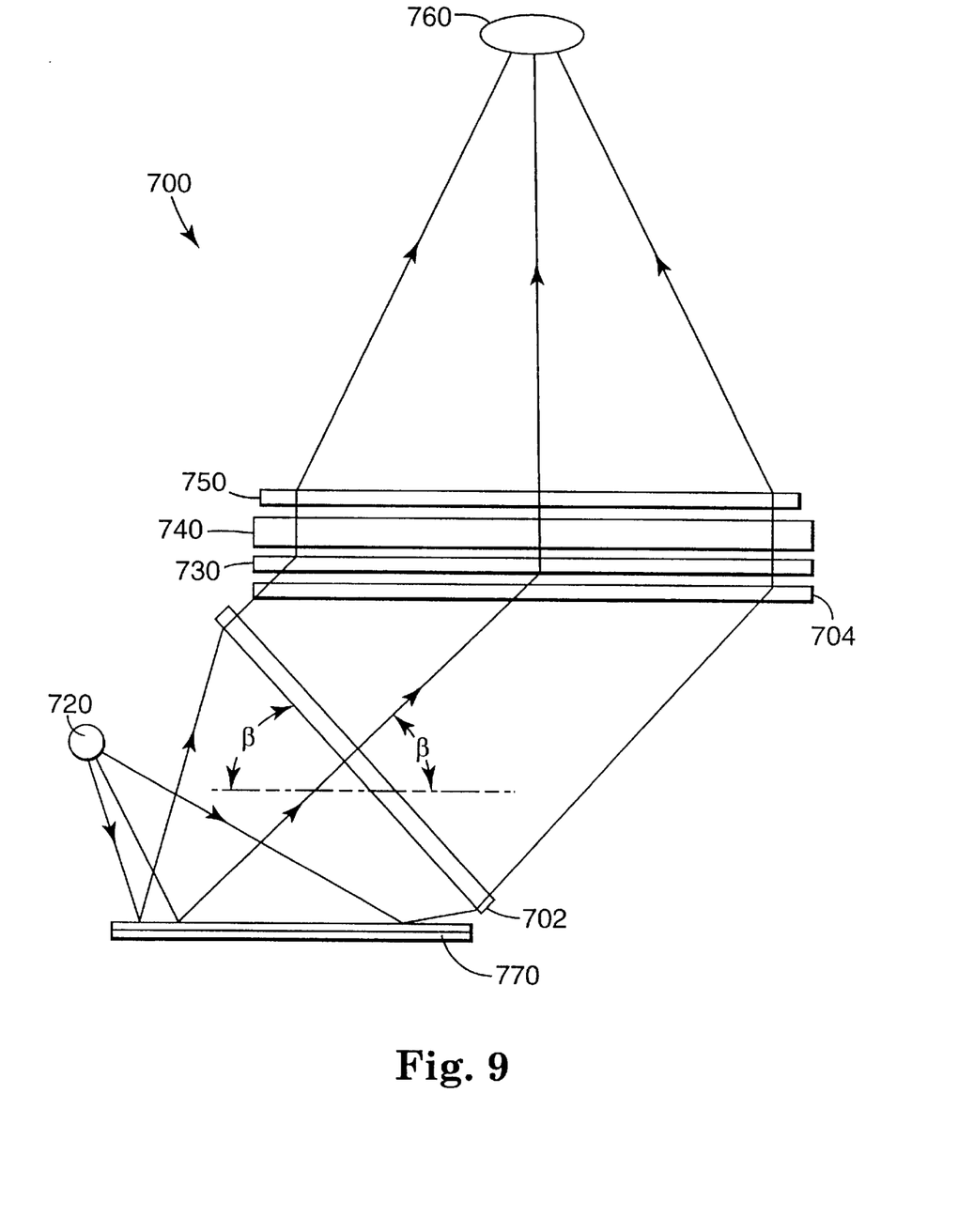
FIG. 9 is a simplified schematic plan view of a third LCD projection system in accordance with the present invention.
Figure 10:
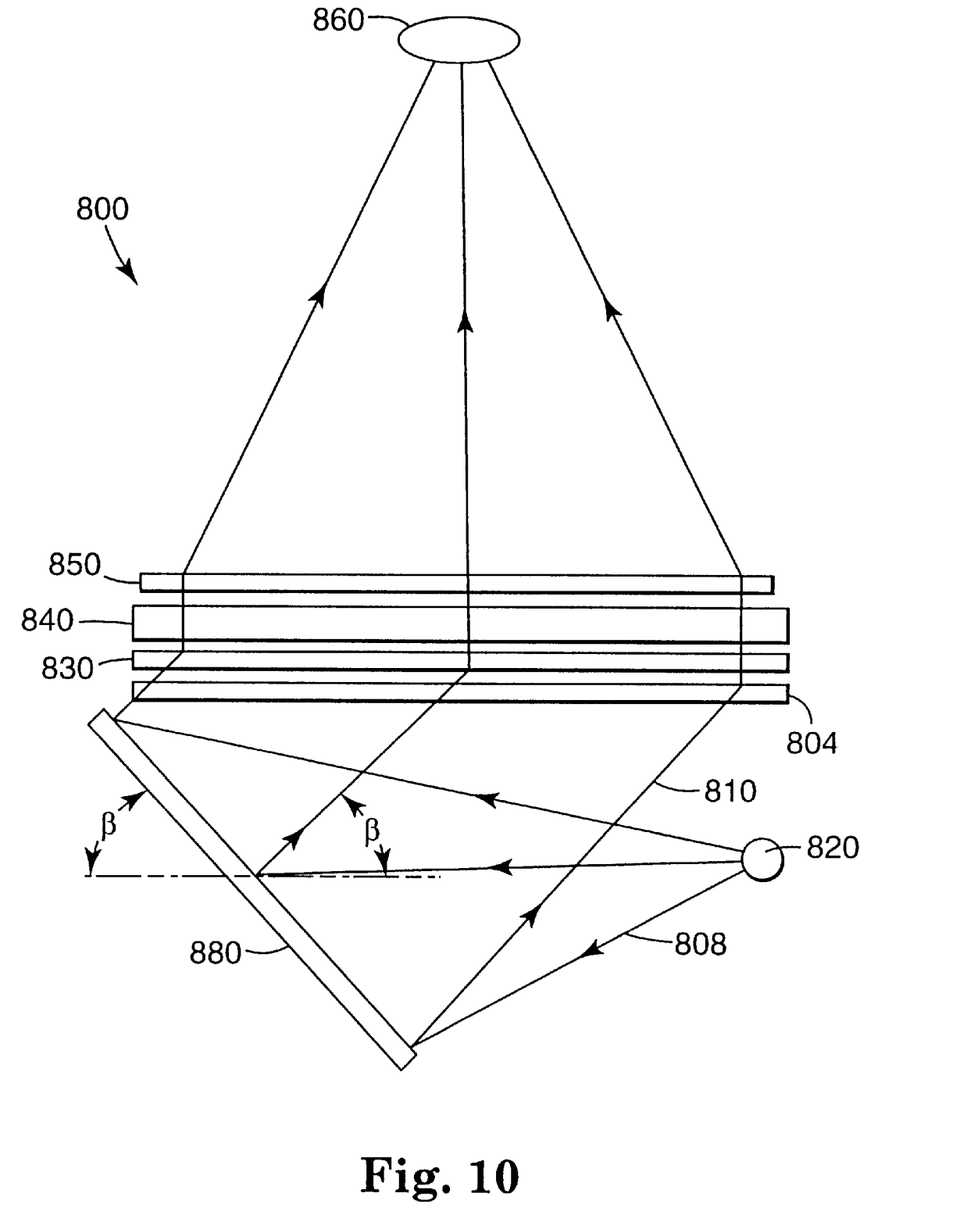
FIG. 10 is a simplified schematic plan view of a fourth LCD projection system in accordance with the present invention.
Figure 11:
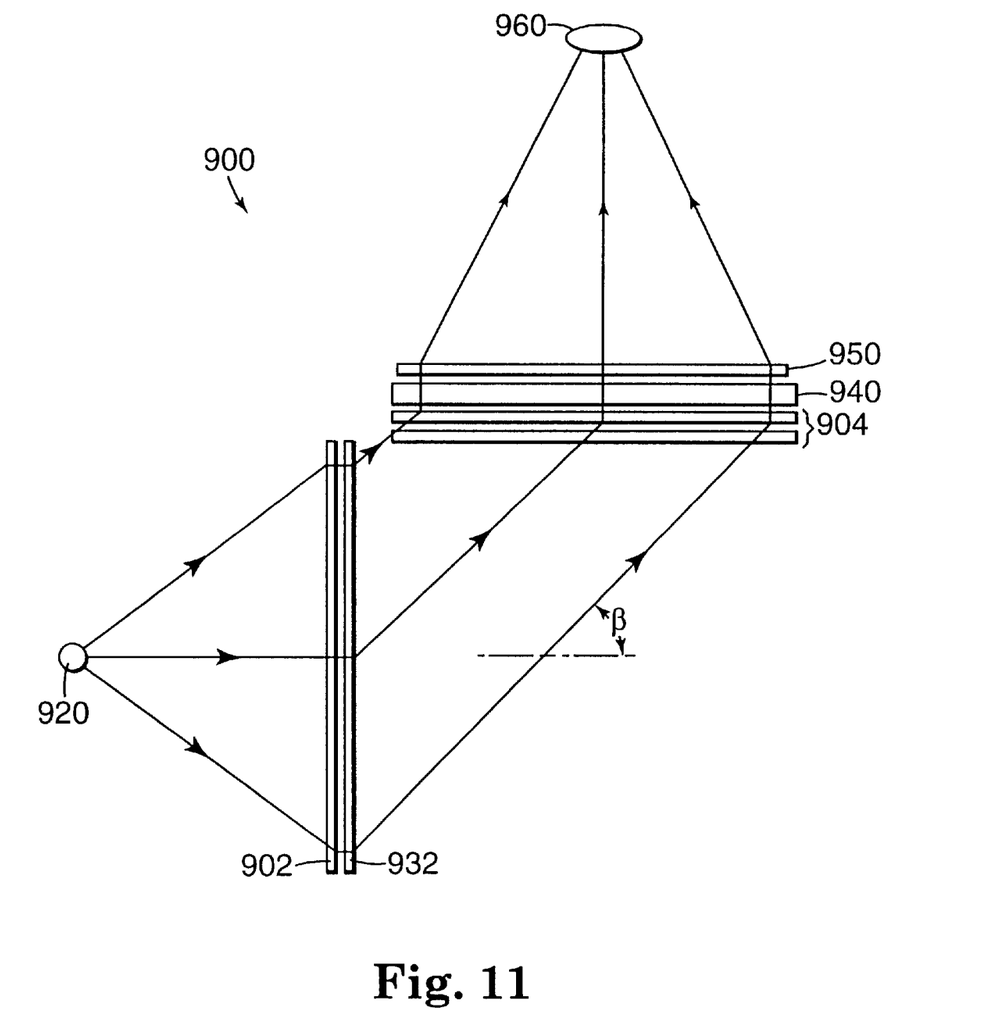
FIG. 11 is a simplified schematic plan view of a fifth LCD projection system in accordance with the present invention.

In FIGS. 9–11, elements similar to those of LCD assembly 600 are identified by reference numerals having the same last two digits. FIG. 9 shows an alternate full-color large-gate LCD projector assembly 700 having a compact arrangement where the path of the lights rays produced by a light source 720 is folded by a planar mirror 770 and directed towards a collimating Fresnel lens 702. The LCD projector assembly 700 includes a planar polarization converter 704 having a light alignment assembly including the collimating Fresnel lens 702. The Fresnel lens collimator 702 is positioned a base angle 180°-β off-axis, while the rest of the polarization converter is aligned parallel to the mirror and to an LCD 740. A rotating half-wave retarder sheet 730 also is shown. In the present example, β=45°.

FIG. 10 shows yet another LCD projector assembly 800 having a compact arrangement where a Fresnel lens collimator and a planar mirror are combined into an off-axis Fresnel reflective collimator 880 that both folds the optical path and directs and collimates light rays 808 produced by a light source 820. The reflective collimator is placed at a base angle of 180°-β and both reflects and collimates the light rays 808 into a collimated light beam 810. The LCD projector assembly 800 further includes a polarization converter 804, a half-wave retarder sheet 830, and LCD panel 840, a converging Fresnel lens 850 and a projection lens 860. The disposition of the reflective collimator 880 also eliminates the need for a light deviating element for the polarization converter 804.

FIG. 11 illustrates another exemplary embodiment of an LCD projector assembly 900. LCD projector assembly 900 has a light alignment assembly, including a light deviating sheet 932 and a Fresnel lens collimator 902, separated from the other elements and placed orthogonally with respect to a planar polarization converter 904. A light source 920 is positioned behind the Fresnel lens collimator 902. The Fresnel lens collimator 902 collimates the light and the light deviating sheet 932 directs the collimated unpolarized light rays at a base angle β towards the planar polarization converter 904.

The polarization conversion system of the present invention has several advantages over those described in the prior art. First, the functioning of the system is independent of transverse positioning of the prismatic sheets or opposite prismatic surfaces of the dual-sided prismatic sheet. Second, the functioning on the system is independent of the prismatic sheet thickness or the separation between prismatic sheets. Third, there are no selective coatings required on any of the prismatic surfaces on these sheets. The retarder and polarization separating films may be applied as planar sheets, separate from the prismatic sheets. These features greatly simplify manufacture of the polarization converter and make it more cost-effective to produce. All the prismatic sheets may be produced by standard plastic molding techniques. If desired, in addition, the prismatich sheets may include antireflection coating for increased light transmission. Finally, a plurality of compact and adaptable LCD projector assembly arrangements are possible, thus allowing the use of the present invention in a variety of applications.

The embodiments described and illustrated herein are illustrative only, and are not to be considered as limitations upon the scope of the present invention. Those skilled in the art will recognize that other variations and modification may be made in accordance with the spirit and scope of the present invention.

What is claimed is:

1. A planar polarization converter for polarizing a beam of light, the order of incidence along the optical path of the beam of light defining front and back positions, the polarization converter comprising:
  a prismatic film having a first prismatic surface, the first prismatic surface having alternating transmissive prismatic facets and reflective prismatic facets positioned at supplementary base angles, the reflective prismatic facets positioned at a second base angle β and the transmissive prismatic facets positioned at a first base angle generally equal to 180°-β;
  a quarter wave retarder film; and
  a reflective polarization film, wherein the quarter wave retarder film is positioned between the prismatic film and the polarization film sheet.

2. The planar polarization converter of claim 1, further comprising a light deviator assembly positioned in front of the prismatic film, wherein the light deviator assembly directs the beam of light in the base angle β.

3. The planar polarization converter of claim 2, wherein the light deviator assembly comprises a light deviating prismatic sheet.

4. The planar polarization converter of claim 2, wherein the light deviator assembly comprises a light deviating prismatic sheet and a collimating lens.

5. The planar polarization converter of claim 2, wherein the light deviator assembly comprises a collimating lens positioned at a base angle generally equal to 180°-β.

6. The planar polarization converter of claim 1, wherein β generally equals 45°.

7. The planar polarization converter of claim 1, further comprising an absorbing polarizer positioned behind the reflective polarization film.

8. The planar polarization converter of claim 7, wherein the quarter wave retarder film, the reflective polarizer film, and the absorbing polarizer film are stacked and mounted on a glass substrate.

9. The planar polarization converter of claim 1, further comprising a beam integrating film positioned behind the reflective polarization film.

10. The planar polarization converter of claim 1, the prismatic film having a second prismatic surface having alternating first and second transmissive facets, wherein the first transmissive facets are generally parallel to the transmissive prismatic facets of the first prismatic surface and the second transmissive facets are generally parallel to the reflective prismatic facets of the first prismatic surface.

11. The planar polarization converter of claim 1 wherein the reflective prismatic facets of the first prismatic surface include a plurality of retroreflective microprisms.

12. The planar polarization converter of claim 11, the microprisms having a vertex angle α, wherein α+2β=180°.

13. The planar polarization converter of claim 2, the light deviation assembly comprising a first and a second prismatic element, wherein the first prismatic element deviates the beam of light a first deviation angle φ and the second prismatic element deviates the beam of light a second deviation angle.

14. The planar polarization converter of claim 13, the first and a second prismatic elements each having alternating first and second prismatic surfaces, wherein the first prismatic surface of the second prismatic element is oriented at the first deviation angle φ, the second prismatic surface of the first prismatic element is oriented parallel to the incident light beam, and the second prismatic surface of the second prismatic element is oriented at φ+90°.

15. The planar polarization converter of claim 14, wherein the first prismatic surface of the first prismatic element is oriented at a base angle generally equal to φ, where φ is equal to or greater than the angle of total internal reflection of the original beam of light.

16. The planar polarization converter of claim 1, the planar polarization sheet having a tilted polarization transmission axis.

17. An liquid crystal display panel including the planar polarization converter of claim 1.

18. A planar polarization converter for polarizing a beam of light, the order of incidence along the optical path of the beam of light defining front and back positions, the polarization converter comprising:
  a light deviator assembly, wherein the light deviator assembly directs the beam of light in an angle β;
  a dual sided prismatic film having a first prismatic surface and a second prismatic surface, the first prismatic surface having alternating transmissive prismatic facets and reflective prismatic facets positioned at supplementary angles, the reflective prismatic facets positioned at a second base angle generally equal to β, the transmissive prismatic facets positioned at a first base angle generally equal to 180°-β, the surface of the reflective prismatic facets having a plurality of retroreflective microprisms, the second prismatic surface having alternating first and second transmissive facets, wherein the first transmissive facets are generally parallel to the transmissive prismatic facets of the first prismatic surface and the second transmissive facets are generally parallel to the reflective prismatic facets of the first prismatic surface;
  a quarter wave retarder film;
  a planar reflective polarization film sheet, wherein the quarter wave retarder film is positioned between the prismatic film and the reflective polarization film sheet;
  an absorbing polarization film positioned behind the reflective polarization film, both polarization films aligned along the same polarization axis; and
  a beam integrating film positioned behind the absorbing polarization film.

19. A liquid crystal display projector comprising:
  a light source producing a beam of light;
  a collimator lens optically aligned to receive the beam of light and produce a collimated light beam;
  a planar polarization converter optically aligned to receive the collimated light beam and produce a polarized light beam, the polarization converter including:
    a prismatic film having a first prismatic surface, the prismatic surface having alternating transmissive prismatic facets and reflective prismatic facets positioned at supplementary base angles, the reflective prismatic facets positioned at a second base angle β and the transmissive prismatic facets positioned at a first base angle generally equal to 180°-β, a quarter wave retarder film, and a reflective polarization film sheet, wherein the quarter wave retarder film is positioned between the prismatic film and the reflective polarization film sheet;

a liquid crystal display panel optically aligned with the polarization converter to receive the polarized light beam and produce an image beam; and a projection lens assembly optically aligned with the liquid crystal panel to receive the image beam.

20. The liquid crystal display projector of claim 19, further comprising a glass condenser between the light source and the collimator lens, and wherein the projection lens assembly includes a converging Fresnel lens and at least one projection lens optically aligned with respect to each other.

21. The liquid crystal projector of claim 19, further comprising a light deviation assembly optically aligned to receive the collimated light beam from the collimator lens, wherein the light deviation assembly directs the beam of light in the angle $\beta$.

22. The liquid crystal projector of claim 21, wherein the collimator lens and the light deviation assembly are parallel with respect to each other and positioned at an angle with respect to the planar polarization converter.

23. The liquid crystal projector of claim 19, wherein $\beta$ is approximately equal to 45°.

24. The liquid crystal projector of claim 19, wherein the collimator lens is oriented at a angle with respect to the planar polarization converter.

25. The liquid crystal projector of claim 24, further comprising a mirror optically aligned to reflect the beam of light towards the collimator lens.

26. The liquid crystal projector of claim 24, the collimator lens being a reflective collimator.

* * * * *